Jan. 17, 1933.   H. E. FORD   1,894,817
SAMPLING AND GAUGING DEVICE
Filed Sept. 17, 1929
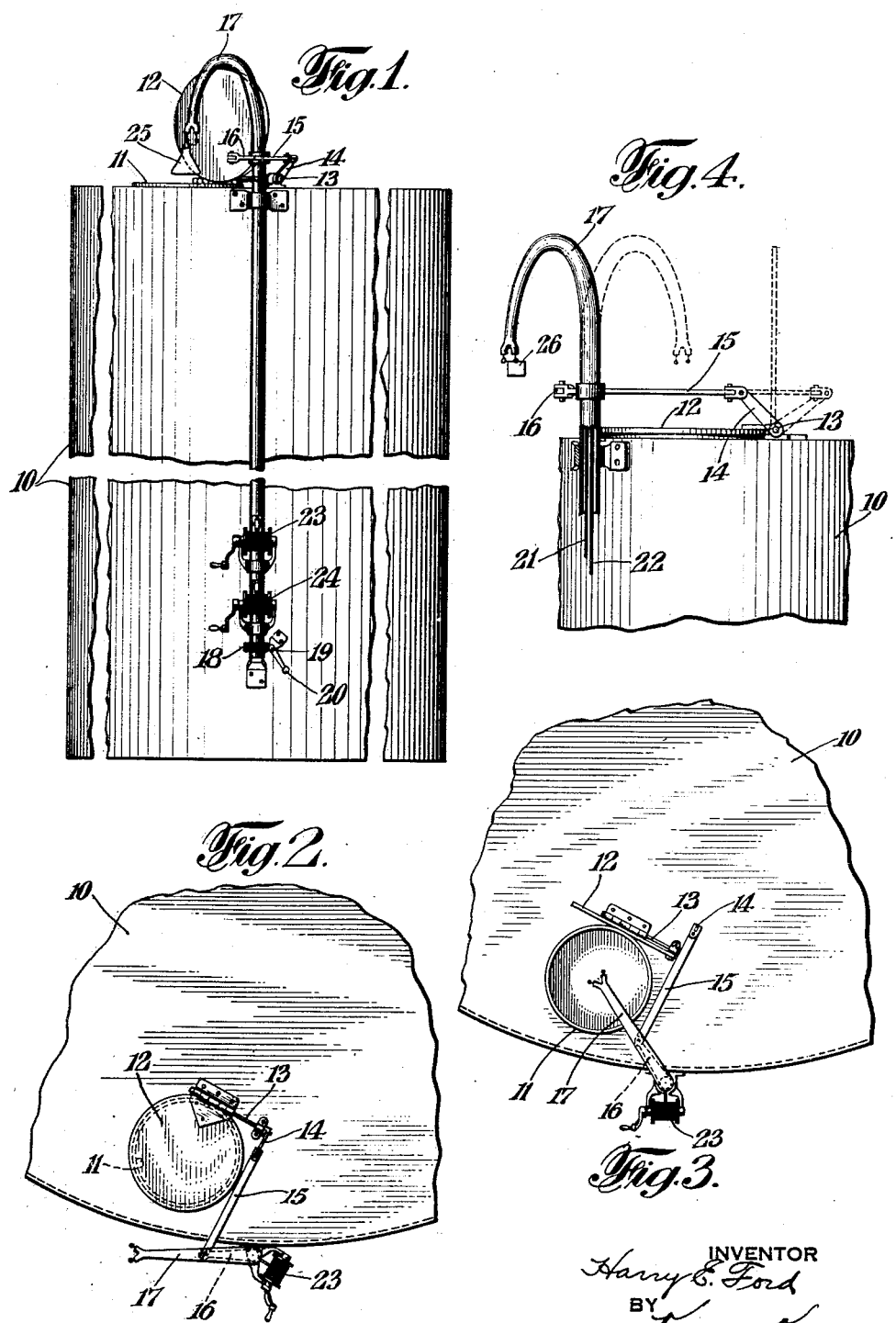
INVENTOR
Harry E. Ford
BY
Kenyon & Kenyon
ATTORNEYS Patented Jan. 17, 1933

1,894,817

UNITED STATES PATENT OFFICE

HARRY E. FORD, OF JERSEY CITY, NEW JERSEY

SAMPLING AND GAUGING DEVICE

Application filed September 17, 1929. Serial No. 393,273.

This invention relates to devices for obtaining samples from and gauging the height of liquid contained in tanks, vats and the like. It is adapted especially for use in connection with crude petroleum storage tanks and other large containers for malodorous substances or those which may give off toxic or unpleasant fumes as well as tanks and vats containing corrosive liquid and the like.

Heretofore, it has been common practice when it was desired to obtain a sample or gauge the depth of liquids such as those above referred to contained in tanks, for the attendant to climb up on top of the tank, remove the manhole cover and let down into the tank a sampling bottle or gauge device. In so doing, the attendant was subjected to the possibility of inhaling toxic fumes and the operation involved considerable time and labor.

An object of this invention is a simple, inexpensive and easily operable device for obtaining samples from or gauging the depth of liquid in tanks, vats and the like without the loss of time and hazards attendant upon the ascending to the top of the tank.

A novel and useful feature of the invention is that it makes it possible for the attendant to perform the required operations of sampling and gauging while remaining on the ground. This not only saves time and labor, but also eliminates the dangers inherent in the present method of performing these tasks as it avoids the possibility of inhalation of toxic fumes arising from the tank.

Other objects, novel features and advantages will be apparent from the following specification and accompanying drawing, wherein:

Fig. 1 is a side elevation of a liquid receptacle equipped with a device embodying the invention.

Figs. 2 and 3 are plan views thereof with the elements in different positions, and Fig. 4 is an enlarged fragmentary elevation partially broken away.

The receptacle 10 is a tank, vat or the like in which liquid is contained. This tank is provided with a manhole or opening 11 in the top and a manhole cover 12 is hinged to the top of the tank. The cover 12 is fixed to a shaft 13 which is provided with an arm 14. The arm 14 is connected by a link 15 to an arm 16 carried by the davit 17 which is rotatably supported by the tank 10 and has a portion extending nearly to the bottom of the tank. The davit carries a worm wheel 18, which meshes with a worm 19 supported by the tank 10 and provided with an operating handle 20. The davit may be caused to rotate about a vertical axis by turning the worm 19 through the medium of the handle 20. Rotation of the davit causes the arm 16, link 15 and arm 14 to effect rotation of the shaft 13, thereby opening and closing the cover 12.

The upper end of the davit 17 extends beyond the vertical wall of the tank 10 when the cover 12 is closed and overlies the manhole 11 when the cover 12 is open. The upper end of the davit is forked to provide a pair of conduits through which extend cables 21 and 22 which lead through the davit to winding reels 23 and 24 respectively, these reels being carried by the davits and provided with operating handles. The upper end of the cable 21 is attached to a sampling bottle 25 of any suitable design and the upper end of the cable 22 is attached to a float 26.

In order to obtain a sample of the liquid contained in the receptacle 10, the davit 17 is rotated so that its upper end overlies the manhole 11, the cover 12 being lifted as above described. The sample bottle 25 is then lowered into the tank by the operation of the reel 23. The bottle is lowered until it drops below the liquid and is filled after which it is raised and the davit swung to locate the sample bottle clear of the tank and to close the cover. The bottle may then be lowered until it is within convenient reach of the attendant.

In using the device to gauge the depth of liquid in the tank the operations are substantially the same. The davit is operated to locate the float 26 above the manhole and to open the cover after which the reel 24 is released and the float is allowed to fall until it strikes the surface of the liquid in the tank. The weight of the float should be sufficient to overcome the resistance of the reel while the float is falling through air, but insufficient to actuate it when the buoyant liquid resists its falling. The cable 22 or reel 24 are provided with calibrations so that the height of the liquid in the tank can be read directly according to the position at which the float comes to rest. When the liquid in the tank is petroleum or other similar fluid and it is desired to measure a layer of water which may be present below the petroleum, an additional cord may be supplied to the upper end of which is attached a weight and a rod surfaced in the manner known in the art with a material which will be wetted by the water in the tank, but not by the petroleum or other non-aqueous liquid.

It can be seen that this invention is a simple, convenient and easily operable means for sampling and gauging the liquid contents of tanks, vats and the like.

It is, of course understood that the embodiment of the invention disclosed herein may be varied in structural arrangement, without in any way departing from the spirit of the invention as defined in the appended claims.

I claim:

1. In combination, an upright tank having an opening in its top wall and a cover for said opening hinged to said top wall, a davit having its upper end projecting above the top of the tank, said davit being rotatable to locate said end over said opening or clear of the tank wall and interconnecting means between said cover and davit for opening and closing said cover upon rotation of said davit.

2. In combination, an upright tank, having an opening in its top wall, a cover for said opening hinged to said top wall, a davit supported by the vertical wall of said tank and rotatable to locate its upper end over said opening or clear of the tank wall and interconnecting means between said davit and cover for opening and closing the latter upon rotation of the former.

3. In combination, an upright tank having an opening in its top wall and a cover for said opening, a davit having its upper end projecting above the top of the tank, said davit being rotatable to locate said end over said opening or clear of the tank wall, interconnecting means between said cover and davit for opening and closing said cover upon rotation of said davit, a cable carried by said davit, reeling means for said cable, and a device attached to the end of said cable to be lowered into said tank.

4. In combination, an upright tank having an opening in its top wall, a cover for said opening hinged to said top wall, a davit supported by the vertical wall of said tank and rotatable to locate its upper end over said opening or clear of the tank wall, interconnecting means between said cover and davit for opening and closing the latter upon rotation of the former, a cable carried by said davit, reeling means for said cable, and a device attached to the end of said cable to be lowered into said tank.

5. In combination, an upright tank having an opening in its top wall and a cover for said opening hinged to its top wall, a davit having its upper end projecting above the top of the tank, said davit being rotatable to locate said end over said opening or clear of the tank wall, interconnecting means between said cover and davit for opening and closing said cover upon rotation of said davit, a cable carried by said davit, reeling means for said cable, a device attached to the end of said cable to be lowered into said tank, and means for manually rotating said davit.

6. In combination, an upright tank having an opening in its top wall, a cover for said opening hinged to said top wall, a davit supported by the vertical wall of said tank and rotatable to locate its upper end over said opening or clear of the tank wall, interconnecting means between said cover and davit for opening and closing the latter upon rotation of the former, a cable carried by said davit, reeling means for said cable, a device attached to the end of said cable to be lowered into said tank, and means for manually rotating said davit.

7. In combination, an upright tank having an opening in its top wall, a cover for said opening, a sample obtaining device, means operable from the base of the tank for lifting said device from the base of the tank and lowering it into the tank through said aperture and for returning said device to its original position, and means operable by said last named means for opening and closing said cover.

8. In combination, an upright tank having an opening in its top wall, a cover for said opening, a sample obtaining device, means operable from the base of the tank for lifting said device from the base of the tank and lowering it into the tank through said aperture and for returning said device to its original position, and connections between said cover and said last named means for opening and closing said cover.

9. In combination, an upright tank having an opening in its top wall, a cover for said opening, means for lifting and lowering a device, means for moving said lifting and lowering means into and out of position to lower and lift said device through said aperture, and means actuated by said lifting and lowering means for opening and closing said cover.

10. In combination, an upright tank having an opening in its top wall, a cover for said opening, means operable at a point removed from said opening for raising and lowering a device, means for moving said raising and lowering means into and out of position to lower and raise said device through said aperture, and connections between said cover and a portion of said raising and lowering means for opening and closing said cover by the movement of said portion.

11. In combination, an upright tank having an opening in its top wall, a cover for said opening, means operable from the base of the tank for lifting a device from the base of the tank and lowering it into the tank through said aperture and for returning said device to its original position, and means actuated by said last named means during operation for opening and closing said cover.

12. In combination, an upright tank having an opening in its top wall, a cover for said opening, a davit supported by said tank and being rotatable to locate its upper end over said opening, and interconnecting means between said davit and cover for opening and closing the latter upon rotation of the former.

13. In combination, an upright tank having an opening in its top wall, a cover for said opening, a davit carried by said tank and being rotatable to locate its upper end over said opening, interconnecting means between said cover and davit for opening and closing said cover upon rotation of said davit, and a cable carried by said davit, said cable being adapted to lower and raise a device through said aperture.

In testimony whereof, I have signed my name to this specification.

HARRY E. FORD.